(12) United States Patent
Fujisaki et al.

(10) Patent No.: US 7,159,115 B2
(45) Date of Patent: Jan. 2, 2007

(54) METHOD AND APPARATUS FOR ENCRYPTING DATA

(75) Inventors: Koichi Fujisaki, Chiba-ken (JP); Atsushi Shimbo, Tokyo (JP); Masahiko Motoyama, Kanagawa-ken (JP); Hanae Ikeda, Kanagawa-ken (JP); Yuuki Tomoeda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 693 days.

(21) Appl. No.: 10/658,340

(22) Filed: Sep. 10, 2003

(65) Prior Publication Data

US 2004/0091107 A1    May 13, 2004

(30) Foreign Application Priority Data

Sep. 11, 2002    (JP)    ............................. 2002-264977

(51) Int. Cl.
*G06F 1/24*    (2006.01)
(52) U.S. Cl. ..................... 713/171; 713/189; 713/193
(58) Field of Classification Search ................ 713/171, 713/189, 193
See application file for complete search history.

(56) References Cited

FOREIGN PATENT DOCUMENTS

| JP | 2000-66585 | 3/2000 |
|---|---|---|
| JP | 2002-311826 | 10/2002 |
| JP | 2002-366029 | 12/2002 |

OTHER PUBLICATIONS

Kawamura et al.; "Encryption/Decryption Apparatus, Encryption/Decryption Method, and Program Storage Medium Therefor", U.S. Appl. No. 09/377,064, filed Aug. 19, 1999.

*Primary Examiner*—Thomas R. Peeso
(74) *Attorney, Agent, or Firm*—Finnegan, Henderson, Farabow, Garrett & Dunner, L.L.P.

(57) ABSTRACT

An encryption apparatus provided with a Feistel type encryption algorithm includes a function operation unit that operates a non-linear function, and changing unit configured to supply the function operation unit with random data unrelated to an encryption operation result. In this way, a countermeasure can be taken against a DPA attack following the end of an operation by the encryption operation apparatus provided with the Feistel type encryption algorithm.

10 Claims, 6 Drawing Sheets

METHOD AND APPARATUS FOR ENCRYPTING DATA

CROSS-REFERENCE TO RELATED APPLICATIONS

This application is based upon and claims the benefit of priority from the prior Japanese Patent Applications No. 2002-264977, filed Sep. 11, 2002 the entire contents of which are incorporated herein by reference.

BACKGROUND OF THE INVENTION

1. Field of the Invention

The present invention relates to an encryption apparatus and method provided with a Feistel type algorithm, and more particularly, to an encryption apparatus and method resistant to a differential power analysis attack.

2. Description of the Related Art

In a conventional differential power analysis ("DPA") attack, an attacker produces a graph related to power consumption during an encryption operation of an encryption operation circuit. Using the power consumption graph, the attacker can steal key information stored in the encryption operation circuit.

In an DPA attack, an attacker inputs a plurality of pieces of data into an encryption operation circuit and obtains measurements of the corresponding power consumption of the encryption operation circuit. Next, the attacker estimates the key information stored in the encryption operation circuit. At this time, if a correlation value between the estimated key information and the power consumption is large, then the estimated key information is correct, otherwise the estimated key information is incorrect. In other words, the DPA attack uses a principle of correlation between the estimated key information and the power consumption of the encryption operation circuit.

In the event of a DPA attack, users of the encryption operation circuit cannot determine, by inspecting the physical appearance of the circuit, whether or not the key information has been stolen by the DPA attack because the DPA attack does not damage or destroy the encryption operation circuit. Therefore, potential damage from the DPA attack is greater than from other types of attacks because the attack is harder to detect. Accordingly, a countermeasure to the DPA attack is important in protecting an encryption operation circuit.

Most common key block cryptosystems, for example smart cards and secure tokens, employ a Feistel type encryption algorithm which was developed by Horst Feistel. Japanese Patent Laid-Open No. 2000-66585 discloses a countermeasure to the DPA attack for an encryption operation circuit utilizing the Feistel type encryption algorithm. More particularly, Japanese Patent Laid-Open No. 2000-66585 discloses that the key information is masked during an operation using the key information so that there is no correlation between the power consumption during the operation using the key information and the key information. This technique disclosed in Japanese Patent Laid-Open No. 2000-66585 is an effective countermeasure to a DPA attack occurring at the end of an operation, but is not the effective countermeasure to a DPA attack occurring after the end of the operation.

BRIEF SUMMARY OF THE INVENTION

According to an aspect related to the present invention, an encryption apparatus includes an encryption operation unit configured to perform a non-linear function, said encryption operation unit being provided with a Feistel type encryption algorithm and configured to output encrypted data; and a changing unit configured to change a result of an encryption operation into irrelevant data for output to the non-linear function, wherein said changing unit starts changing the result into said irrelevant data after said encrypted data is output.

According to another aspect related to the present invention, An encryption apparatus includes an encryption processing unit configured to iterate a specified operation in order to encrypt data and to externally output the encrypted data, said encryption processing unit, including: a non-linear transformation circuit configured to non-linearly transform an input first data block based on input key information and configured to output the non-linearly transformed result value, a logical operation circuit configured to logically operate on the non-linearly transformed result value and an input second data block and configured to output the logical operated result value, and a substitution module configured to substitute said second data block with said first data block and said first data block with the logical operated result value; and a changing module configured to change said key information input into said non-linear transformation circuit into a value unrelated to said key information, wherein said changing module begins execution after said encrypted data is output from said encryption processing unit.

According to another aspect related to the present invention, an encryption apparatus includes an encryption processing unit configured to iterate a specified operation in order to encrypt data and to externally output the encrypted data, said encryption processing unit, including: a non-linear transformation circuit configured to non-linearly transform an input first data block based on input key information and configured to output the non-linearly transformed result value, a logical operation circuit configured to logically operate the non-linearly transformed result value and an input second data block and configured to output the logical operated result value, and a substitution module configured to substitute said second data block with said first data block and said first data block with the logical operated result value; and a first changing unit configured to change said first data block input into said non-linear transformation circuit into a value unrelated to said first data block, wherein said first changing unit begins execution after said encrypted data is output from said encryption processing unit.

According to another aspect related to the present invention, an encryption apparatus provided with a Feistel type encryption algorithm including a non-linear transformation includes a register configured to store data in the encryption apparatus; and a changing unit configured to change a data block to be applied to said non-linear transformation into a value unrelated to the data block in order to supply the register with information unrelated to an encryption process, wherein said changing unit begins execution after said encrypted data is output.

According to another aspect related to the present invention, an encryption apparatus provided with a Feistel type encryption algorithm including a non-linear transformation includes a register storing data in the encryption apparatus; and a changing unit configured to change key information to be applied to said non-linear transformation into a value unrelated to the key information in order to supply the register with information unrelated to an encryption processing, wherein said changing unit begins execution after said encrypted data is output.

According to another aspect related to the present invention, a method for encrypting data in an encryption apparatus utilizing a Feistel type encryption algorithm includes receiving data to be encrypted; performing an encryption operation on the received data to produce encrypted data; outputting the encrypted data; changing the encrypted data into irrelevant data; and performing a non-linear operation on the irrelevant data.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several aspect related to the invention and together with the description, serve to explain the principles of the invention.

DETAILED DESCRIPTIONS OF THE INVENTION

Reference will now be made in detail to aspects related to the present invention, examples of which are illustrated in the accompanying drawings. Wherever possible, the same reference numbers will be used throughout the drawings to refer to the same or like parts.

Figure 1:
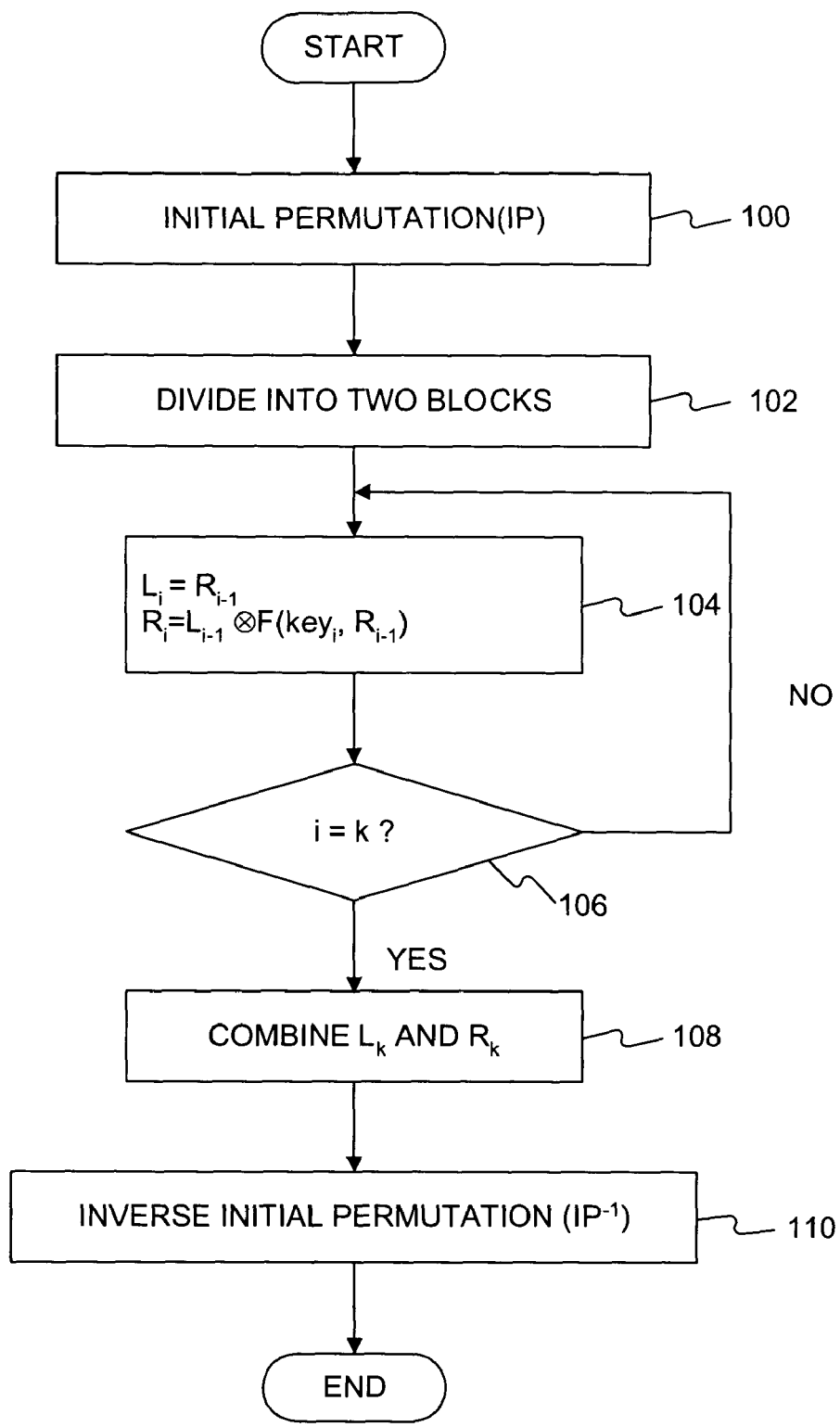
FIG. 1 is a flowchart illustrating processing by a Feistel type encryption algorithm in an encryption operation circuit.

FIG. 1 is a flowchart illustrating of the flow of processing by a Feistel type encryption algorithm in an encryption operation circuit. First, the encryption operation circuit subjects an input block data to be encrypted to an Initial Permutation ("IP"). The IP rearranges data among input block data bits (stage 100). Then, the encryption operation circuit divides the block data after the initial permutation into two blocks each having n/2 bits (stage 102). Next, using these two blocks as initial values, the encryption operation circuit iterates the following operation (stage 104).

$$L_i = R_{i-1}$$

$$R_i = L_{i-1} \otimes F(\text{key}_i, R_{i-1})$$

where i is the number of operations ($1 \leq i \leq k$), $R_i$ is the right block data in the i-th operation, $L_i$ is the left block data in the i-th operation, $\text{key}_i$ is the i-th key information, F is a function for carrying out a non-linear operation, and is an exclusive OR (XOR).

After the iteration operation (stage 106) is iterated k times, the encryption operation circuit combines the results of the operations $R_k$ and $L_k$ (stage 108). Specifically, the encryption operation circuit combines $L_k$ as the block of the higher order n/2 bits and $R_k$ as the block of the lower order n/2 bits into n-bit block data.

Finally, the encryption operation circuit subjects the combined block data to an inverse initial permutation ("$IP^{-1}$"), and the result is obtained and the operation ends (stage 110).

Figure 2:
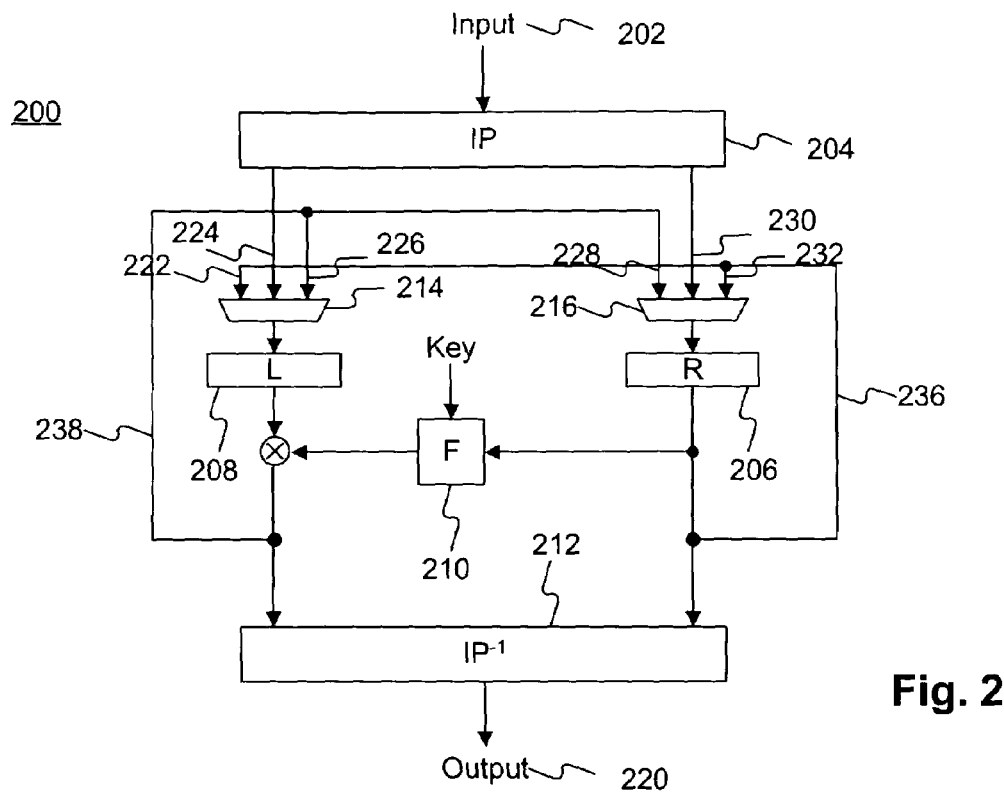
FIG. 2 is a diagram of a circuit configuration for a data path portion in an encryption operation circuit provided with a Feistel type algorithm.

FIG. 2 is a block diagram of the configuration of a data path portion in an encryption operation circuit 200 provided with a Feistel type encryption algorithm. Encryption operation circuit 200 includes an IP unit 204, an R register 206, an L register 208, a function operation unit 210, an $IP^{-1}$ unit 212, 3-input-1-output selectors 214 and 216, and data paths 236 and 238.

IP unit 204 is a circuit module that carries out an initial permutation operation on an input 202 based on predetermined rules. Function operation unit 210 is a circuit module that carries out the operation of a prescribed non-linear function F. $IP^{-1}$ unit 212 is a circuit module that carries out an inverse initial permutation operation based on rules reciprocal to the predetermined rules utilized by IP unit 204. L register 208 and R register 206 each have an n/2 bit width. 3-input-1-output selectors 214 and 216 respond to a signal from a control circuit unit (not shown) and select data to be input to L register 208 and R register 206. The three inputs (222, 224, and 226) to selector 214 are the value of the higher order n/2 bits from the IP unit 204, the output value of R register 206, and a value produced by XORing the output value of L register 208 and the output value of function operation unit 210. Meanwhile, the three inputs (228, 230, and 232) to selector 216 are the value of the lower order n/2 bits from IP unit 204, the output value of R register 206, and a value produced by XORing the output value of L register 208 and the output value of function operation unit 210. After all iterations are finished, encryption operation circuit 200 produces an output 220.

The result of the encryption operation processed in the above described configuration is $C=(C_l, C_r)$ and can be expressed as follows:

$$C = IP^{-1}\{(L_k \otimes F(\text{key}_k, R_k)), R_k\}.$$

In encryption operation circuit 200, $IP^{-1}$ unit 212 only changes the arrangement of bits, and therefore the value of $R_k$ can readily be specified from the operation result C. Once the value $R_k$ is specified, the output value of function operation unit 210 after the operation is determined only by the value of one variable in the key information, $\text{key}_k$. Consequently, using the output result from function operation unit 210 as an attacking point, the key information $\text{key}_k$ can be estimated and a DPA attack can be performed.

If there is a correlation between fluctuations in the power consumption and the operation of the key information by function operation unit 210, the attacker can determine the key information. More particularly, the attacker carries out a DPA attack the moment when an encryption operation ends and steals the key information in the encryption operation circuit. This kind of DPA attacks can be prevented, for example, by the technique described in Japanese Patent Laid-Open No. 2000-66585.

An encryption operation circuit provided with a Feistel type encryption algorithm can be subjected to an attack at any point after the end of an encryption operation (the time after the end of the operation and onward) in addition to the moment when the encryption operation ends, and the key information in the encryption operation circuit can be stolen by the DPA attack. Data may be controlled in the data path portion at the time of outputting an operation result from the encryption operation circuit by two different methods. The DPA attacking points after the encryption operation differ depending on the method by which the data is controlled.

Figure 3:
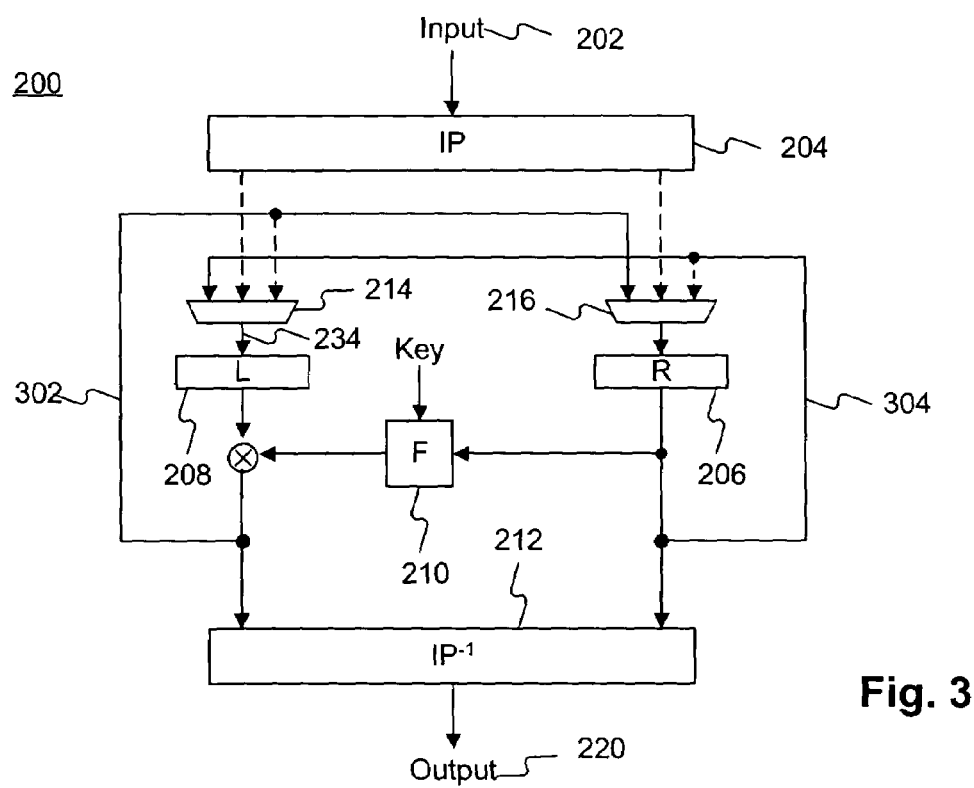
FIG. 3 is a diagram of a data path portion in a cross-type circuit configuration for the encryption operation circuit shown in FIG. 2.

FIG. 3 is a diagram of a data path portion in a cross-type circuit configuration for the encryption operation circuit shown in FIG. 2. According this configuration, selector 216 selects a data path 302, and selector 214 selects a data path 304 at the time of outputting an operation result. In this configuration, the data of L register 208 and R register 206 are exchanged and the operation ends. In other words, encryption operation circuit 200 employs a cross type circuit configuration.

Figure 4:
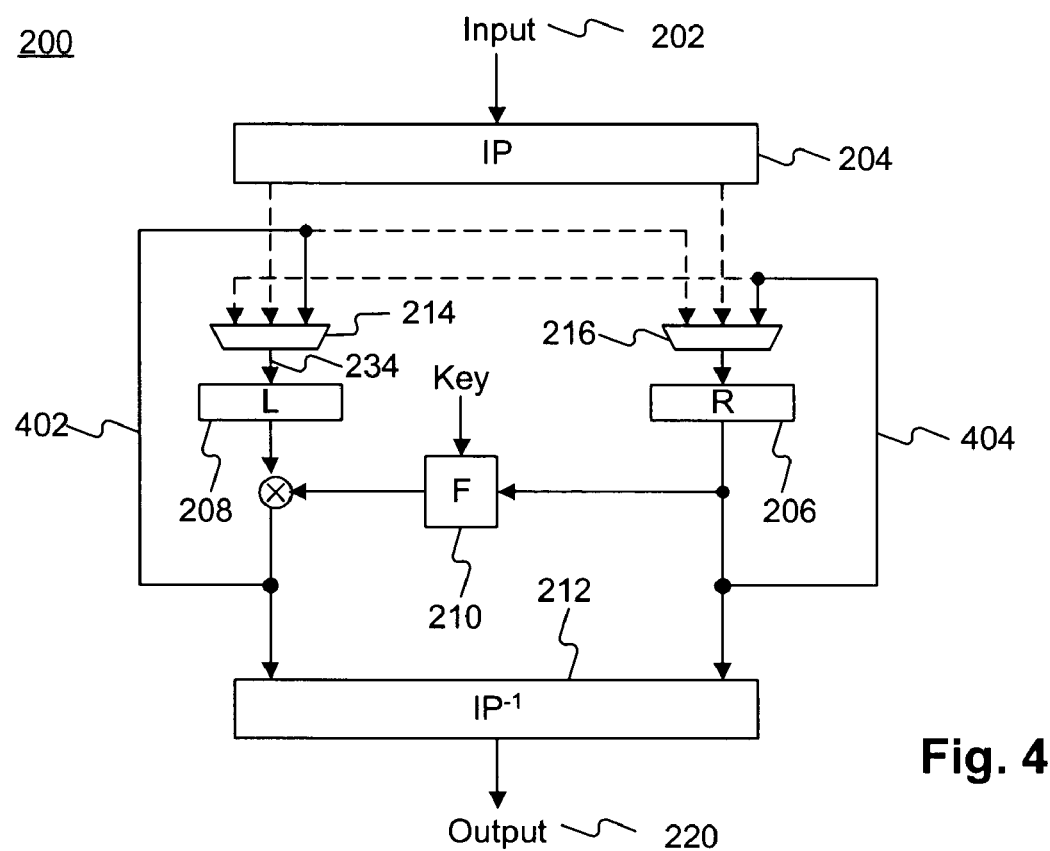
FIG. 4 is a diagram showing a data path in a straight-type circuit configuration for the encryption operation circuit shown in FIG. 2.

FIG. 4 is a diagram showing a data path in a straight-type circuit configuration for the encryption operation circuit shown in FIG. 2. According to this configuration, selector 216 selects data path 404 and selector 214 selects data path 402 at the time of outputting an operation result. In this configuration, the data of L register 208 and R register 206 are not exchanged and the operation ends. In other words, encryption operation circuit 200 employs a straight-type circuit configuration.

In an encryption operation circuit 200 provided with a Feistel type encryption algorithm, in order to carry out the iteration operation determined by the algorithm, a control circuit (not shown) controls selectors 214 and 216 so that the left and right data are exchanged. In encryption operation circuit 200, when an operation result is output, the operation is controlled to end in the cross-type circuit configuration having the left and right data exchanged, unless it is particularly necessary to do otherwise. The cross-type circuit configuration is employed because the control of exchanging the left and right data similar to the iteration operation is easily carried out and the scale of the circuit can be small rather than the control of changing the data flow in the time of outputting the operation result even when the operation result is output.

Additionally, in a circuit provided with Triple Data Encryption Standard (Triple DES or 3DES) which carries out DES three times, a control circuit must prevent left and right data from being exchanged between the end of the first DES operation and the start of the second DES operation and between the end of the second DES operation and the start of the third DES operation. Therefore, after the third DES operation, the straight type circuit configuration is often employed so that the left and right data are not exchanged before output. The control circuit avoids switching between the cases during an operation as much as possible in order to reduce the circuit scale. Selectors 214 and 216 are controlled to have the straight type circuit configuration at the end of the third operation as well as at the end of the first and second operations, so that the number of switches between operation can be reduced and the scale of the control circuit can be reduced.

As described above, when a Feistel type encryption algorithm is provided, an encryption operation circuit employs the cross or straight-type circuit configuration.

Now, the difference between the attacking points by a DPA attack after the end of an operation depending upon the difference between these circuit configurations will be described. First, the timing of attacking points by a DPA attack and the reason for the cross type circuit configuration will be described with reference to FIG. 3.

At a time of a clock signal $Clock_{fin}$ for outputting an operation result, the value of L register 208 is $L_{fin}$, and the value of R register 206 is $R_{fin}$. At this time, if the result of operation by the encryption operation circuit is C, C can be expressed using the result of L register 208 encryption operation, $C_l$, and the result of R register 206 encryption operation, $C_r$, as follows:

$$C = IP^{-1}(C_l, C_r) = IP^{-1}(L_{fin} \otimes F(key_{fin}, R_{fin}),$$

where $IP^{-1}$ is a processing for changing the arrangement of bits in the inverse initial permutation. Therefore, the values of $R_{fin}$ and $L_{fin}F(key_{fin}, R_{fin})$ are readily available from the operation result C.

Now, when the clock signal is $Clock_{fin+1}$, if R register 206 can be written with a value, the value of R register 206 is $L_{fin}F(key_{fin}, R_{fin}) = R_{fin+1}$. At this time, the key information is same as $key_{fin}$ at the $Clock_{fin}$. Therefore, the output of function operation unit 210 is $F(key_{fin}, R_{fin+1})$. The value $R_{fin+1}$ is readily determinable from the output result of the encryption operation circuit, and therefore the function F by the function operation unit 210 can be regarded as a function with $key_{fin}$ as a single variable.

In this manner, using the transition in the output of function operation unit 210 as an attacking point, an attacker estimates the output of function operation unit 210. From this, the key information is determined.

Alternately, the transition in the value of L register 208 can also be used as an attacking point. The values of L register 208 in the times of $Clock_{fin}$ and $Clock_{fin+1}$ are $L_{fin}$ and $L_{fin+1}$, respectively. The transition in the value of the L register 208 can be expressed as follows:

$$L_{fin} \otimes L_{fin+1} = R_{fin-1} \otimes R_{fin}$$

The right side of the above expression is rewritten based on that the value of L register 208 in the cross-type circuit configuration that satisfies the relation $L_i = R_{i-1}$ ($1 \leq i \leq k$). Here, $R_{fin}$ is a value that can externally be measured. Therefore, $R_{fin-1}$ can be estimated. The transition in L register 208 is related to the fluctuations in the power consumption of encryption operation circuit 200, and therefore the value of $R_{fin-1}$ can be specified by a DPA attack. More specifically, as described above, based on the operation result C, the values of $L_{fin}F(key_{fin}, R_{fin}) = R_{fin+1}$ and $R_{fin}$ can be measured. Here, since $L_{fin} = R_{fin-1}$, once $R_{fin-1}$ is specified $R_{fin+1}$, $L_{fin}$, and $R_{fin}$ are available, so that $key_{fin}$ can be determined.

As described above, during the transition in the output value of function operation unit 210 or the transition in the value of L register 208, an attacker can carry out a DPA attacks with success.

In the cross-type circuit configuration, various countermeasures can be taken to prevent such DPA attacks as will be described with reference to FIGS. 5–10.

Figure 5:
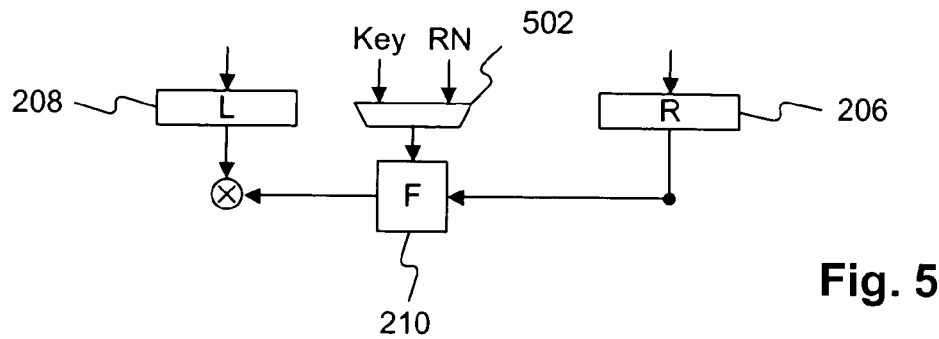
FIGS. 5 to 12 are diagrams of exemplary configurations of an encryption operation circuit including a countermeasure against a DPA attack consistent with aspects related to the present invention.

As a countermeasure against a DPA attack related to the output value of function operation unit 210 at the time of $Clock_{fin+1}$ in the cross-type circuit configuration, the encryption operation circuit 200 configuration is adapted so that a value input to function operation unit at the time of $Clock_{fin+1}$ is a value irrelevant to the key information. FIG. 5 is a block diagram illustrating an example of this adaptation of encryption operation circuit 200. As shown in FIG. 5, an additional selector 502 is provided in a location for inputting key information to function operation unit 210.

The key information, key, is input until the time of Clock$_{fin}$, and, then, in and after the time of Clock$_{fin+1}$, a random number, RN, may be input.

Figure 6:
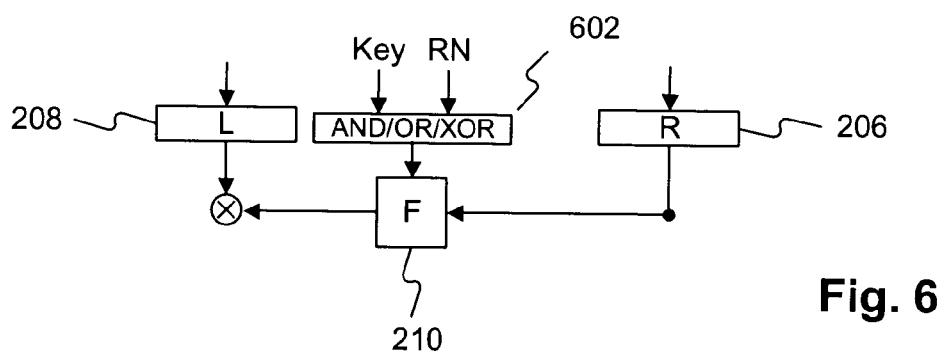

Alternatively, FIG. 6 is a block diagram illustrating an example of an adaptation to encryption operation circuit 200 including a logical operation circuit 602. As shown in FIG. 6, a value produced by an exclusive OR ("XOR") operation, a logical multiplication ("AND") operation, or a logical addition ("OR") operation between the key information, key, and a random number, RN, may be input into function operation unit 210 At the times in and after Clock$_{fin+1}$, an operation result produced by applying a different random number, RN, at each clock cycle is input. In this way, the above problems are solved.

Figure 7:
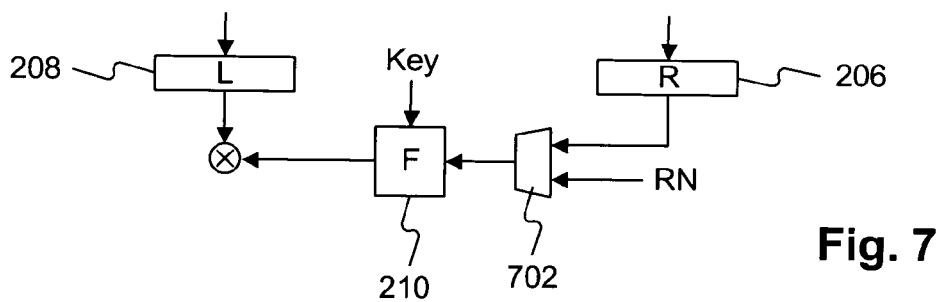

Another encryption operation circuit configuration that prevents an externally measurable value from being input to function operation unit 210 can also be an effective countermeasure. FIG. 7 is a block diagram illustrating an example this configuration of encryption operation circuit 200. As shown in FIG. 7, a selector 702 is provided preceding the input of function operation unit 210, and random numbers, RN, can be input instead of the content of R register 206 in and after the time of Clock$_{fin+1}$.

Figure 8:
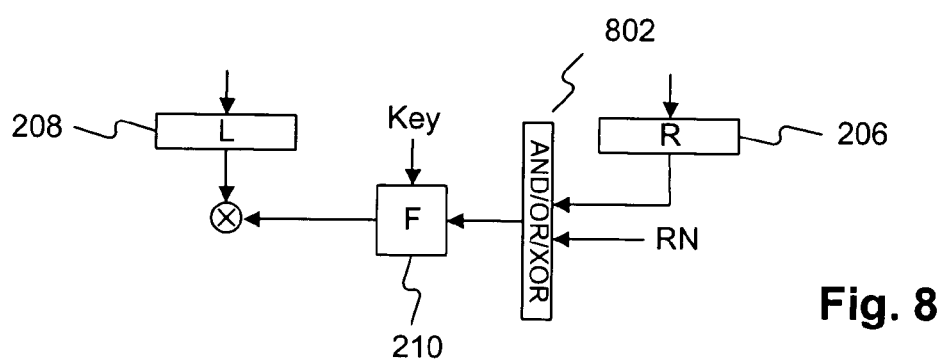

Alternatively, FIG. 8 is a block diagram illustrating an example of another configuration of encryption operation circuit 200. As shown in FIG. 8, in place of selector 702, encryption operation circuit 200 can include an additional operation circuit 802. The result of an operation between the value of R register 206 and a random number, RN, can be input into function operation unit 210. These encryption operation circuit configurations prevent key information used in the encryption operation circuit or an operation result from being directly input to function operation unit 210 in and after the time of Clock$_{fin+1}$. This can thwart DPA attacks in relation with the output of function operation unit 210.

Figure 9:
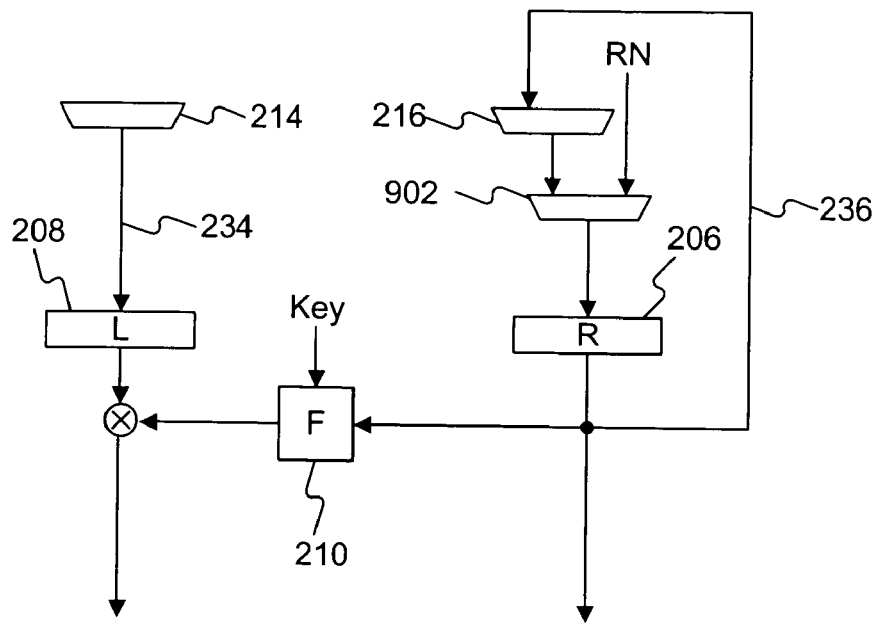

In addition, setting the value of R register 206 as an irrelevant value for the result of operation in and after Clock$_{fin}$ can work as a countermeasure against DPA attacks. The reason for using Clock$_{fin}$ not Clock$_{fin+1}$, depends on the layout of the circuits. FIG. 9 is a block diagram illustrating an example of this configuration of encryption operation circuit 200. As shown in FIG. 9, encryption operation circuit 200 can include a selector 902 that precedes the input of R register 206, so that a random number, RN, is written in R register 206 from selector 902 in and after the time of Clock$_{fin+1}$.

Figure 10:
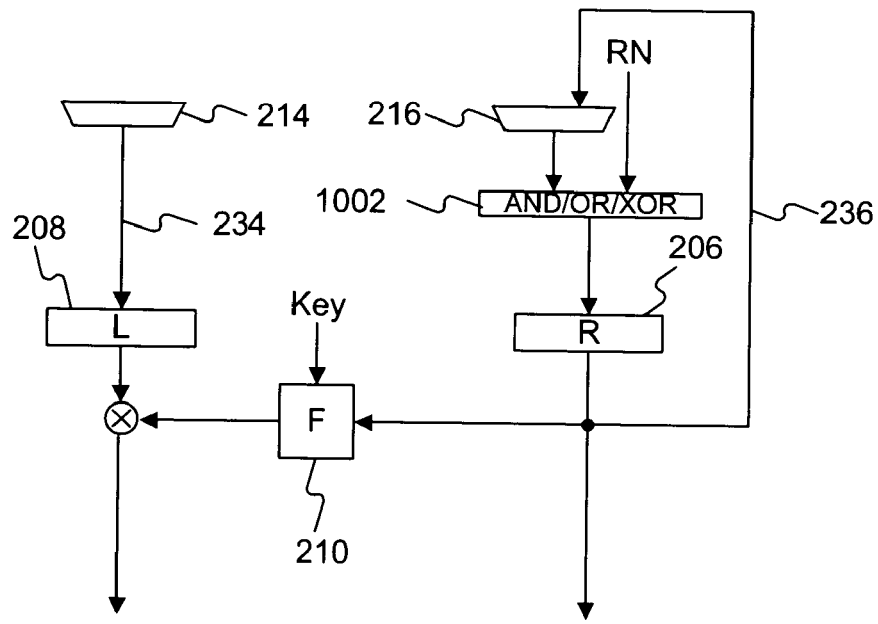

Alternatively, FIG. 10 is a block diagram illustrating another example of this configuration of encryption operation circuit 200. As shown in FIG. 10, the result of data path 236 and a random number, RN, may be subjected to a logical operation performed by a logical operation circuit 1002. The encryption operation circuit provided with the above-described countermeasure prevents an attacker from attacking using the transition in the output of function operation unit 210 as an attacking point in a DPA attack.

Figure 11:
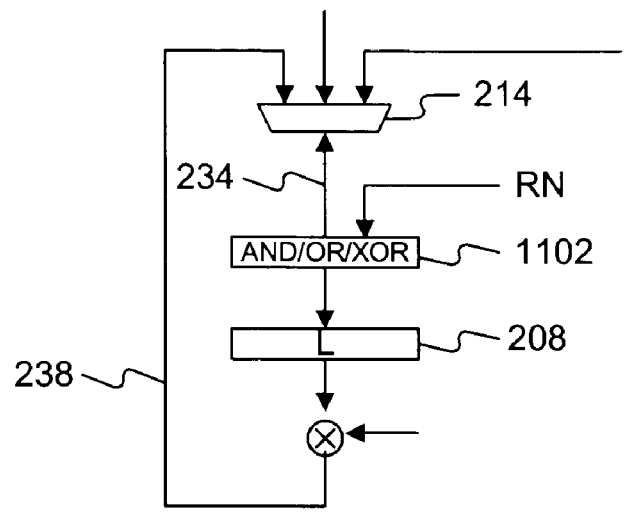

When the transition in the value of L register 208 is assumed as an attacking point, R$_{fin}$ should not be written in L register 208 at and after the time of Clock$_{fin}$. FIG. 11 is a block diagram illustrating an example of a configuration of encryption operation circuit 200 to achieve this result. As shown in FIG. 11, encryption operation circuit 200 includes an operation circuit 1102, for example, for performing AND/OR/XOR operations, on a data path 238 to L register 208. The result of operation between the value on data path 238 and a random number can be written in L register 208 in and after the time of Clock$_{fin+1}$.

Figure 12:
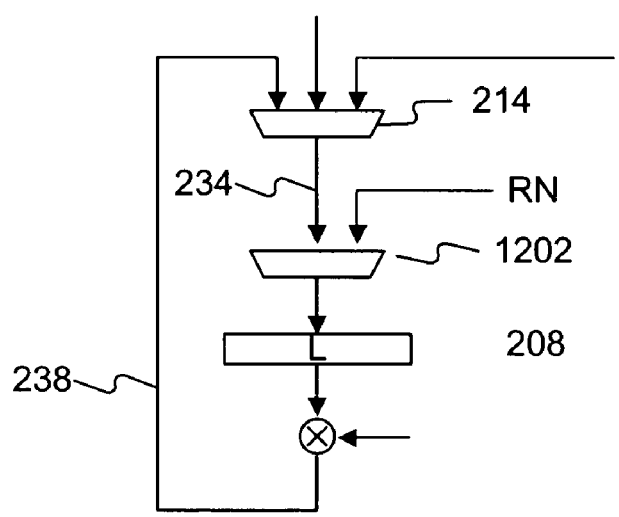

Alternatively, FIG. 12 is a block diagram illustrating another example of a configuration of encryption operation circuit 200 to achieve this result. As shown in FIG. 12, a selector 1202 may be provided in data path 238, so that a random number, RN, may be written in L register 208 in and after the time of Clock$_{fin+1}$. The encryption operation circuit provided with these countermeasure described above can prevent the attacker from using the transition in the value of L register 208 as an attacking point.

Now, the time and operation of a DPA attack in the straight type circuit configuration as illustrated in FIG. 4 will be described.

Similarly to the cross-type circuit configuration, in the straight type circuit configuration, the value of L register 208 is L$_{fin}$ and the value of R register 206 is R$_{fin}$ at the time of clock signal Clock$_{fin}$ for outputting an operation result. At the time of the next clock signal Clock$_{fin+1}$ following Clock$_{fin}$, the values of L and R registers 208 and 206, L$_{fin+1}$ and R$_{fin+1}$, respectively, can be represented by the following expressions:

$$L_{fin+1} = L_{fin} \otimes F(key_{fin}, R_{fin})$$

$$R_{fin+1} = R_{fin}$$

In the time of Clock$_{fin+1}$, with respect to the transition in the value of L register 208, the transition can be written as L$_{fin}$ ⊗ L$_{fin+1}$ = F(key$_{fin}$, R$_{fin}$). The transition F in the value of L register 208 F(key$_{fin}$, R$_{fin}$) includes information relevant to the key information and R$_{fin}$ can externally be measured. Therefore, when a DPA attack is carried out in relation to the transition in the value of L register 208, the key information, key$_{fin}$, in the encryption operation circuit can be determined.

Therefore, the circuit configuration is adapted so that the value of L register 208 has no correlation with the key information of the encryption operation circuit at the time of Clock$_{fin+1}$. Such a circuit configuration can be implemented, for example, by providing a logical operator circuit 1202, such as AND, OR, and XOR circuit, on data path 238 to L register 208 shown in FIG. 11. The encryption operation circuit 200 functions similarly to the cross-type circuit configuration. Alternatively, writing the result of operation between the value of data path 238 and a random number, RN, in L register 208, or by switching between the value of data path 238 and a random number, RN, using a selector 1102 at the time of Clock$_{fin}$ can be done, as shown in FIG. 12.

When the circuit configuration is adapted so that key$_{fin}$ and R$_{fin}$ are always input to function operation unit 210 at and after the time of Clock$_{fin}$, the key information could be specified based on the transition in the output value of function operation unit 210 similarly to the cross-type circuit configuration described above. Therefore, similar to the DPA countermeasure in function operation unit 210 for the cross-type circuit configuration shown in FIGS. 5 to 10 can be used to implement the countermeasure in the straight type circuit configuration.

If data is not written in the R and L registers 206 and 208 at the time of Clock$_{fin+1}$ or Clock$_{fin}$ whether the circuit has the cross-type circuit configuration or the straight type circuit configuration, and key information key$_{fin}$ is always input to function operation unit 210 in and after Clock$_{fin+1}$ or Clock$_{fin}$, the output value F (key$_{fin}$, R$_{fin}$) of function operation unit 210 results. Therefore, similar to the cross-type circuit configuration as described above, the transition in the output value of function operation unit 210 could be vulnerable to a DPA attack. Therefore, the DPA countermeasure in function operation unit 210 for the cross type circuit configuration shown in FIGS. 5 to 10 can be used to implement the countermeasure in the straight type circuit configuration.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. An encryption apparatus, comprising:
an encryption processing unit configured to iterate a specified operation in order to encrypt data and to externally output the encrypted data, said encryption processing unit, including:
a non-linear transformation circuit configured to non-linearly transform an input first data block based on input key information and configured to output the non-linearly transformed result value,
a logical operation circuit configured to logically operate on the non-linearly transformed result value and an input second data block and configured to output the logical operated result value, and
a substitution module configured to substitute said second data block with said first data block and said first data block with the logical operated result value; and
a changing module configured to change said key information input into said non-linear transformation circuit into a value unrelated to said key information,
wherein said changing module begins execution after said encrypted data is output from said encryption processing unit.

2. An encryption apparatus comprising:
an encryption processing unit configured to iterate a specified operation in order to encrypt data and to externally output the encrypted data, said encryption processing unit, including:
a non-linear transformation circuit configured to non-linearly transform an input first data block based on input key information and configured to output the non-linearly transformed result value,
a logical operation circuit configured to logically operate the non-linearly transformed result value and an input second data block and configured to output the logical operated result value, and
a substitution module configured to substitute said second data block with said first data block and said first data block with the logical operated result value; and
a first changing unit configured to change said first data block input into said non-linear transformation circuit into a value unrelated to said first data block,
wherein said first changing unit begins execution after said encrypted data is output from said encryption processing unit.

3. An apparatus according to claim 2, further comprising a second changing unit configured to change said key information input into said non-linear transformation circuit into a value unrelated to said key information, wherein said second changing unit starts execution after said encrypted data is output from said encryption processing unit.

4. An encryption apparatus comprising:
an encryption operation unit configured to perform a non-linear function, said encryption operation unit being provided with a Feistel type encryption algorithm and configured to output encrypted data; and
a changing unit configured to change a result of an encryption operation into irrelevant data for output to the non-linear function,
wherein said changing unit starts changing the result into said irrelevant data after said encrypted data is output.

5. An encryption apparatus according to claim 4, wherein said irrelevant data is data used to change key information which is to be provided to the non-linear function.

6. An encryption apparatus according to claim 4, wherein said irrelevant data is data used to change a first block data which is to be applied to the non-linear function.

7. An encryption apparatus provided with a Feistel type encryption algorithm including a non-linear transformation, comprising:
a register storing data in the encryption apparatus; and
a changing unit configured to change a data block to be applied to said non-linear transformation into a value unrelated to the data block in order to supply the register with information unrelated to an encryption process,
wherein said changing unit begins execution after said encrypted data is output.

8. An encryption apparatus provided with a Feistel type encryption algorithm including a non-linear transformation, comprising:
a register storing data in the encryption apparatus; and
a changing unit configured to change key information to be applied to said non-linear transformation into a value unrelated to the key information in order to supply the register with information unrelated to an encryption processing,
wherein said changing unit begins execution after said encrypted data is output.

9. An encryption apparatus according to claim 8, further comprising
a second changing unit configured to change a data block to be applied to said non-linear transformation into a value unrelated to the data block in order to supply said register with information unrelated to said encryption processing, wherein said second changing unit starts execution after said encrypted data is output.

10. A method for encrypting data in an encryption apparatus utilizing a Feistel type encryption algorithm, comprising:
receiving data to be encrypted;
performing an encryption operation on the received data to produce encrypted data;
outputting the encrypted data;
changing the encrypted data into irrelevant data immediately after outputting the encrypted data; and
performing a non-linear operation on the irrelevant data.

* * * * *